Feb. 9, 1965  G. M. MAST  3,168,859
IDENTIFICATION CAMERA
Filed Dec. 12, 1961  3 Sheets-Sheet 1

*INVENTOR*
G. M. MAST
BY
*ATTORNEY*

Feb. 9, 1965   G. M. MAST   3,168,859
IDENTIFICATION CAMERA
Filed Dec. 12, 1961   3 Sheets-Sheet 2

INVENTOR
G. M. MAST
BY
ATTORNEY

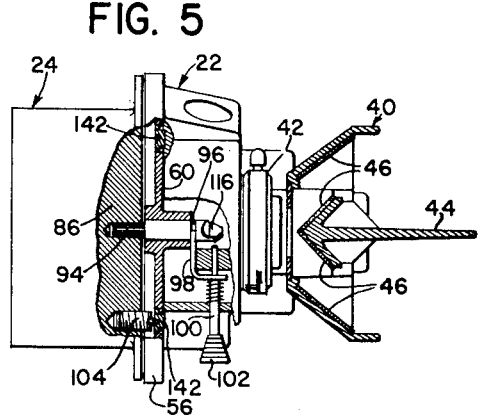
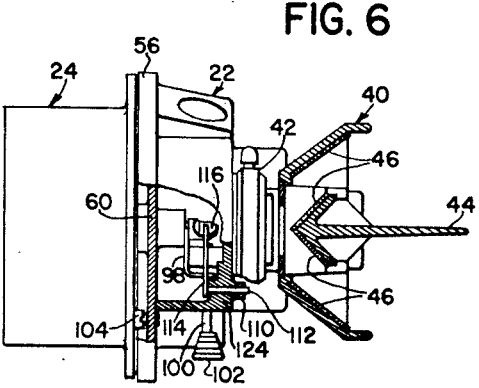
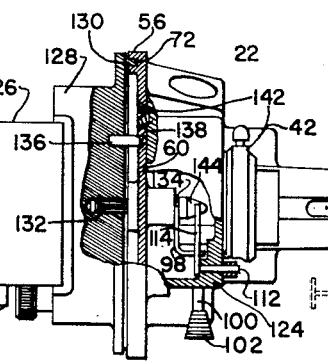
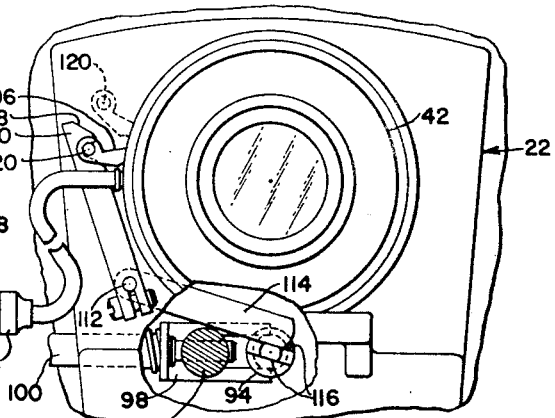
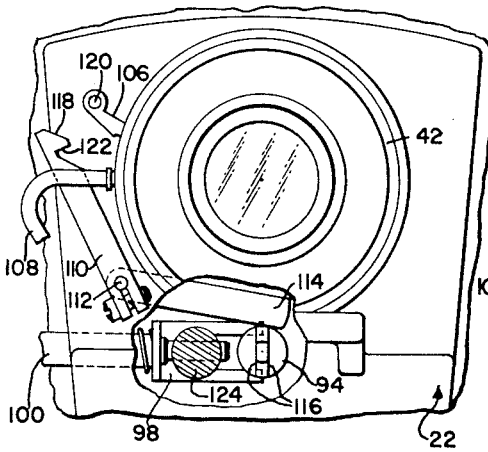
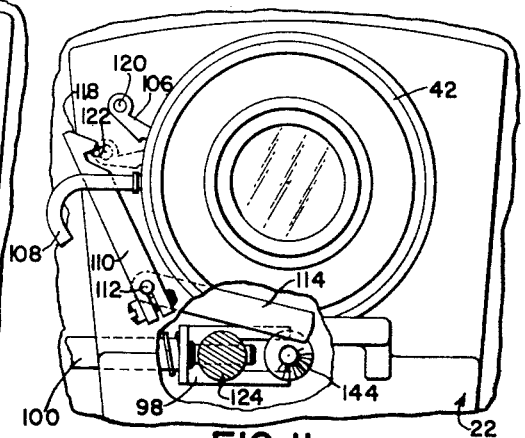

United States Patent Office 3,168,859
Patented Feb. 9, 1965

3,168,859
IDENTIFICATION CAMERA
Gifford M. Mast, Davenport, Iowa, assignor to Mast Development Co., Davenport, Iowa, a corporation of Iowa
Filed Dec. 12, 1961, Ser. No. 158,671
7 Claims. (Cl. 95—38)

This invention relates to an identification camera and more particularly to improved structures and arrangements whereby a better quality of that type of camera can be produced and sold at a lower cost and whereby the use of the camera is rendered easier and more flexible.

It is common practice in the taking of photographs for identification purposes, as for personnel records, badges etc. to employ a beam-splitting or "stereo" device so that "twin" pictures are taken simultaneously, one of the pictures being given to the subject and the other retained in the records of the plant, company and the like. It is also known to shift the film-carrying part of the camera vertically relative to the lens so that a second pair of "twin" pictures can be taken, either of the same or a different subject. Although cameras of this type have been commercially accepted in the exploitation of the system just outlined, certain problems have arisen in both the construction and use thereof, primarily problems involving the possibility of double exposures, the amount of time consumed in the process, and the lack of interchangeability between a basic camera body and different types of film-carrying backs.

According to the present invention, these problems are eliminated to a considerable extent by the provision of an improved camera structure having as one significant feature thereof the mounting of a camera back on the camera body in such manner that the back is turnable about an axis offset from and paralleling the optical axis, whereby selectively different portions of the film can be presented to the lens for exposure. This type of arrangement finds particular utility in the "stereo" type of camera wherein two sets of "twin" photographs can be taken. It is a further object of the invention to provide means for preventing double exposure of the film, and a further object is to tie in the shutter control means with the turnable camera back so that the shutter can be actuated only once for each position of the camera back. A still further object of the invention is to provide a camera body which is readily adapted for interchangeability between at least two different types of camera backs. Another object of the invention is to provide a camera arrangement in which the optical axis is offset relative to the center of the picture and is so related to means for positioning the subject as to eliminate the distortion found in prior art arrangements.

The foregoing and other important objects and desirable features inherent in and encompassed by the invention will become apparent to those versed in the art as a preferred embodiment thereof is disclosed in detail in the ensuing description and accompanying sheets of drawings, the figures of which are described below.

FIGURE 5 is a plan view of the structure shown in FIGURE 4, with certain portions thereof in section through the center of the camera back and through the center of the beam-splitting device.

FIGURE 6 is a section similar to FIGURE 5 but illustrating the sectional portion in the area of the shutter control means.

FIGURE 7 is an enlarged fragmentary front view with portions broken away to illustrate one phase of the shutter control means.

FIGURE 8 is a similar view, illustrating another phase of the shutter control means.

FIGURE 10 is a view similar to FIGURE 6 but illustrating the camera body in conjunction with a camera back of a type different from that shown in FIGURES 1 through 8.

FIGURE 11 is a view similar to FIGURE 8 but showing the relationship of the shutter control means with the camera back as shown in FIGURE 10.

Figure 1:
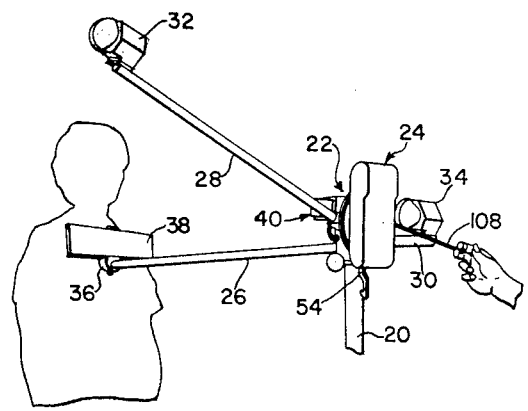
FIGURE 1 is a perspective view, on a reduced scale, illustrating the use of the camera.
Figure 2:
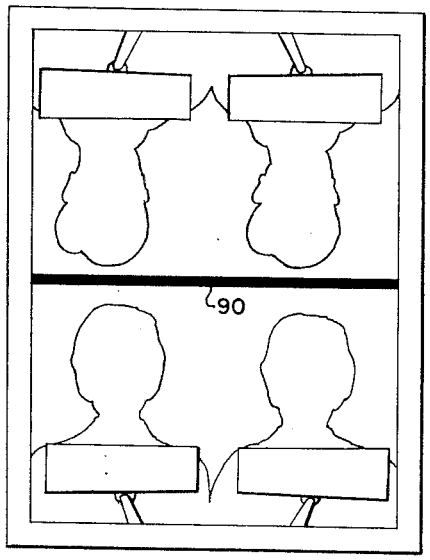
FIGURE 2 is a face view, on an enlarged scale, showing a typical "double" photograph.
Figure 9:
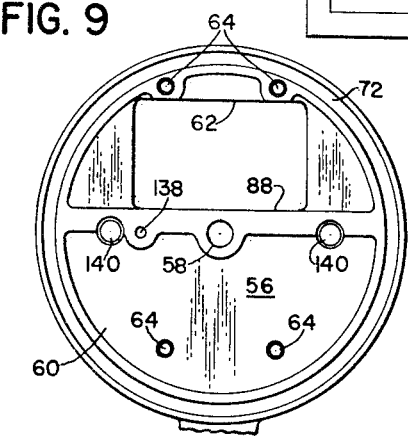
FIGURE 9 is a rear view of the rear part of the camera body as would be seen generally along the line 9—9 of FIGURE 4, with extraneous portions removed.
Figure 3:
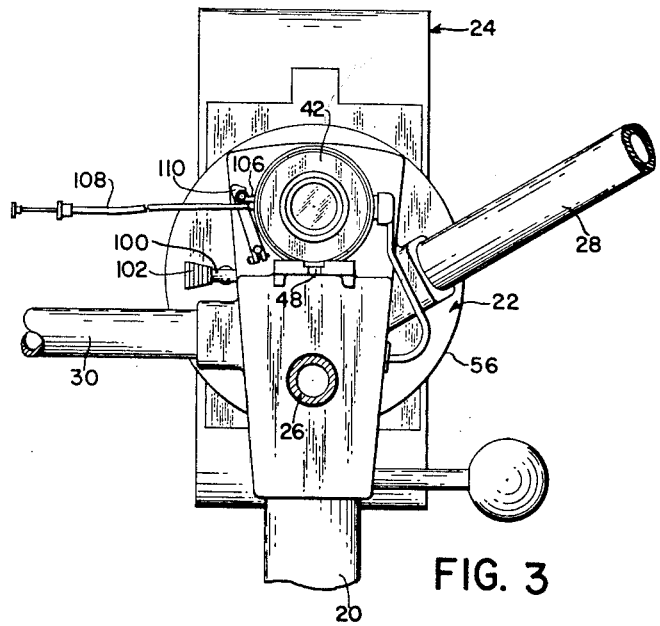
FIGURE 3 is a front elevation, with portions broken away, other portions shown in section and the beam-splitting device removed.

For purposes of orientation, reference will be had first to FIGURES 1 and 2. In FIGURE 1, the numeral 20 represents the upper portion of any conventional standard or tripod which carries the camera arrangement of FIGURES 1 through 9, which apparatus includes a camera body 22 and a camera back 24. This back in this particular case is typical of a camera of the "Polaroid" make, which have found considerable use in the taking of identification photographs.

The camera body 22 is preferably in the form of a casting which has provision therein for the mounting of a plurality of arms 26, 28 and 30. The arms 28 and 30 serve as means for mounting suitable light sources, which may be of any conventional type, represented here generally at 32 and 34. The arm 32 extends straight ahead of the camera, parallel to the optical axis of the camera and has at its forward terminal end means in the form of any suitable attaching bracket 36 for mounting a title board 38, which may bear identification of the subject to be photographed. When the subject is to be photographed in a standing position, he or she is placed at what may be regarded the back side of the title board, with the principal plane of his or her face generally coplanar with the indicia-bearing face of the title board, and with the major portion of the head and neck above the top marginal edge of the title board. The length of the arm 26 is of course based on the focal length of the camera and, as will be presently brought out, the relationship of the title board otherwise to the subject is such that an improved photograph is taken. FIGURE 2 represents a typical photograph having upper and lower "twins," it being clear, as will be brought out below, that only one-half the film in the back 24 is used for each exposure. The duplicate photographs in each of the upper and lower sections are the results of the employment with the camera of a beam-splitting device, indicated in its entirety by the numeral 40. The camera body is of course equipped with a suitable lens, as at 42, and the device 40 is mounted centrally ahead of the lens. This device may be of any conventional type, having a central fore-and-aft web 44 and two sets of opposed mirrors 46 which function in conventional fashion to split the beam of light through the lens 42, with the result that two photographs are taken simultaneously. Any suitable means, such as that represented by the slot 48 and thumb screw 50, may be utilized to removably mount the beam-splitting device in place. It will be clear that each exposure will include the head and shoulders of the subject, and of course will also include the title board 38 which bears the identification of the subject. To the extent described, the system and arrangement may be regarded as generally conventional and therefore is not set forth in greater detail.

The fore or front part of the camera body 22 is represented by the lens 42, and the interior of the camera body is essentially hollow but is horizontally partitioned at 52 from those portions thereof which serve as sockets for receiving the arms 26, 28 and 30 and the upright of the standard or tripod 20. Connection of the base of the camera body 22 to the upper end of the tripod or standard 20 may be effected by any suitable clamp means, such as that shown at 54. The rear part of the camera body 22 is represented by a back plate or element 56, which is shown in elevation by itself in FIGURE 9. This plate is generally circular as viewed in front or rear elevation, except for the lower portion thereof which cooperates with the clamp 54, and the center or axis of the plate is provided with a bore 58 which lies within the lower substantially semicircular half of the plate, which half is generally in the form of a closure web 60. The upper substantially semicircular half of the plate has therein a rectangular light-transmitting opening 62. The portions of the plate immediately bordering the opening 62 may be regarded as continuations of the web 60 and these portions as well as the web 60 may be drilled at 64 to receive cap screws 66 which are in turn received by tapped bores 68 extending forwardly into the camera body 22, for the purpose of rigidly attaching the back plate 56 to the camera body in light-tight relationship and in such position relative to the lens 42 that the axis of the plate, which passes through the bore 58, is offset below the optical axis of the lens, here represented by the numeral 70, which relationship will be presently explained.

Figure 4:
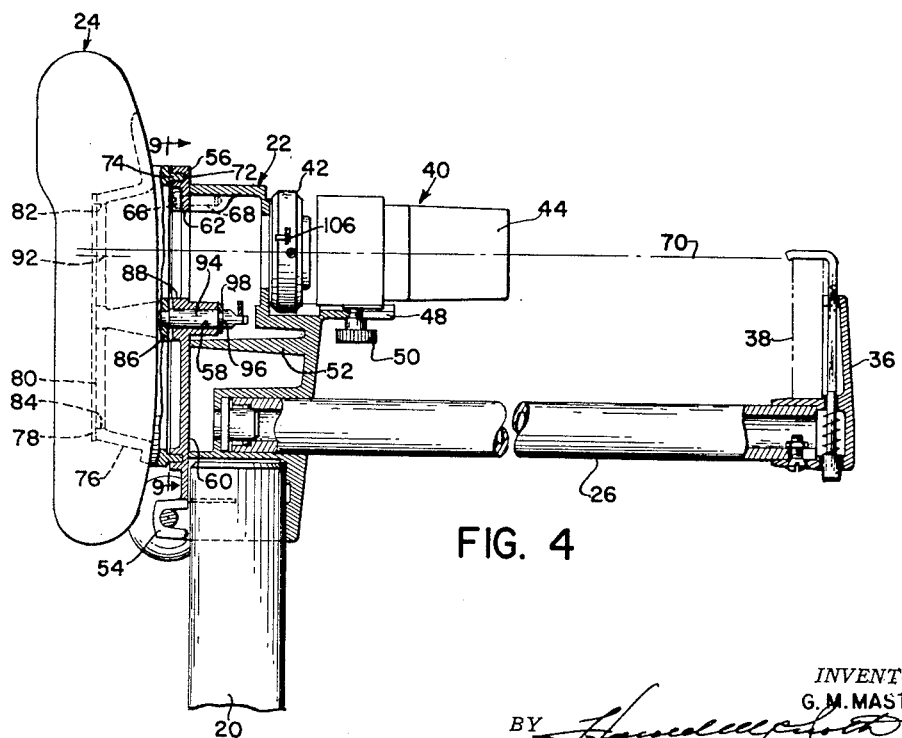
FIGURE 4 is a side elevational view, partly in section generally along the median plane of the apparatus, with the camera back, lens and beam-splitting device shown in elevation.

The plate 56 thus becomes in essence a part of the camera body 22 and as means for mounting the camera back 24 thereon, its peripheral portion is provided in the nature of ring means, here comprising a rearwardly facing annular groove 72 concentric about the axis of the bore 58. The front face of the camera back 24 has a concentrically interfitting ring means in the form of an annular rib 74, and the two ring means combine to effect a light-tight seal. The back 24, as is typical of the "Polaroid" camera, carries means, represented generally by the numeral 76, for carrying a film, indicated at 78, in an upright position over a film plane 80 which is of course perpendicular to the optical axis 70. The means 78 is open at 82 and 84 to expose the portion of the film respectively behind them. As shown in FIGURE 4, the upper film portion is exposed via the opening 82 to the beam of light coming through the lens 42 via the opening 62 in the back plate 56. Because of the beam-splitting device 40, the "twin" exposures will be effected on the upper section of the film, which is of course separated from the lower section by transverse partition means at 86, which may be regarded as an extension of the partition means established by the upper marginal edge 88 of the web 60, which edge also of course is coincident with the bottom of the light-transmitting opening 62, the point being, of course, that the lower section of the film is light-separated from the upper section of the film. This will be evidenced by the dark "divider" which appears in the ultimate double photograph, as represented at 90 in FIGURE 2.

A feature of the invention lies in the relationship among the optical axis 70, the center of the film section and the upper edge of the title board 38. As best shown in FIGURE 4, the upper edge of the title board 38 is coincident with an extension of the optical axis 70. It will also be seen in this figure that the actual center of that portion of the film plane representing the upper exposure is located at 92, in slightly downwardly offset relationship to the optical axis. This relationship is significant in eliminating much of the distortion that occurs in other camera arrangements, because the perspective taper of the title board, because of the stereoscopy of the pair of pictures is substantially eliminated. A further advantage of this arrangement is that it enables the use of the camera at a lower position, since it is "looking up" at the subject being photographed.

As previously stated, it is a feature of the invention to mount the camera back 24 on the camera body 22 so that it can be turned about a central axis among a plurality of positions. In the present case, two positions are utilized, on being that shown in FIGURE 4 and the other being a symmetrical position turned 180° from that illustrated, in which the lower opening of the film-carrying element 76 is registered fore-and-aft with the lens and opening 62. For the purpose of so mounting the back 24, it is equipped with a forwardly extending shaft or pin 94, the rear portion of which may be knurled, grooved, etc. so that it may be rigidly affixed to the back in the web portion 86. The shaft extends forwardly through the bore 58 in the center of the back plate 56 and is rotatable as well as axially slidable in this bore. The forward portion of the pin, just short of its forward terminal end, has therein an annular groove 96 which, in the normal position of the back, lies just ahead of the front surface of the boss through which the bore 58 extends. A locking clip represents releasable means engageable with the front end of the pin via the groove 96, this clip being indicated at 98 as being transversely slidably carried by the camera body through the medium of a spring-loaded plunger 100, the exterior end of which is formed as a handle 102 accessible for manual operation. The bias of the spring normally maintains the clip 98, the inner end of which is forked to cooperate with the groove 96, in its inward position as shown in FIGURE 5, for example, and when it is desired to remove the back 24, the plunger 100 is withdrawn via its handle 102 sufficiently to clear the forked inner end of the clip 98 from the groove 96. The back 24, together with its contents and the pin 94 are then removable as a unit. The pin 94, being rotatable in the bore 58, serves the further function of mounting the back 24 on the body 22 for rotation between the two diametrically opposite positions as already described. Since the ring means 72-74 are concentric with the axis of the pin 94, the light seal is effective at all times. The two positions of the back relative to the body 22, as turned about the axis of the pin 94, may be detented, as shown at 104 (FIGURE 5). This predetermines the positions and enables the operator to accurately position the back in one position or the other.

It is a further feature of this invention in this respect that the bi-positionable back is associated with means for preventing a double exposure of the same section of the film. The lens 42 is of course equipped with shutter means, the presence of which is represented by the shutter arm appearing at 106, best illustrated in FIGURES 7, 8 and 11. The shutter is of the self-cocking type so that actuation of the release lever 106 from the dotted-line position of FIGURE 7 to the full-line position in the same figure causes the shutter to open and close again for an instantaneous exposure. This means that even with the shutter closed the arm 106 can be retained in the full-line position of FIGURE 7 and consequently the shutter cannot be actuated until the arm is permitted to return to its dotted-line position. In this regard, it should be noted that the dotted-line position of FIGURE 7 corresponds to the full-line positions of the lever or arm 106 in FIGURES 8 and 11. The shutter is conventionally controlled by a release cable as at 108.

Releasable means is provided for temporarily retaining the arm 106 in the full-line position of FIGURE 7, which means includes a locking arm 110 pivoted at 112 by means of a shaft rockably carried by a portion of the camera body 22. As best shown in FIGURE 6, the arm 112 extends through a front wall of the camera body so that its inner or rear end is within the interior of the body, at which point it has rigidly secured thereto a transverse control arm 114, the terminal end of which is controlled by cam means on the forward end of the shaft 94, which cam means here takes the form of a diametrical portion having opposite flat sides 116.

When the camera back 24 is in the position of FIGURE 4, or in its other position 180° from that position, the flats 116 occupy the position of FIGURE 7, it being clear, of course, that the shaft, being carried by the camera back, turns with the back. Consequently, the external arm 110 occupies the position shown in FIGURE 7, and has an upper cam surface 118 positioned in the path of a pin 120, carried by the shutter arm 106, as this pin swings in an arc from its dotted-line position to its full-line position. The pin engages the cam surface 118 and displaces the arm 110 in a counterclockwise direction, raising the internal arm 114. However, the weight of the arm 114 is such as to bias the assembly 110-112-114 in a clockwise direction, with the result that as soon as the pin 120 on the shutter arm 106 passes the cam surface 118 on the arm 110, a hook 122 on the arm 110 just below the cam surface 118 catches the pin 120, preventing the arm 106 from returning to its dotted-line position of FIGURE 7. Thus, the shutter of course closes but the actuating arm 106 is retained in the full-line position of FIGURE 7 and cannot be again actuated until it is returned to its dotted-line position, thus preventing double exposure of the upper film section, in the condition presently assumed.

However, when the user turns the camera back to its inverted or second position, which is of course symmetrical with the first position, the pin or shaft 94 is of course rotated, in this case through a clockwise direction and in the range of 180°, which means that the cam portion 116 elevates the arm 114 (FIGURE 8), causing counterclockwise rocking of the assembly 110-112-114 so that the displacement of the arm 110 is sufficient to release the hook 122 from the pin 120 on the carrier arm 106. Since the shutter arm is of course spring-loaded, it will return to its actuating position (dotted lines in FIGURE 7 and full lines in FIGURES 8 and 11). This conditions the shutter for a second actuation but not until the camera back has been turned to its new position. When the shutter is again operated in the new position of the camera back, the releasable locking of the shutter arm 106 will again occur as before, and release will be followed by turning the camera again back to its first position.

For purposes of clarity, it should be explained that the circular portion shown in section at 124 in FIGURES 7, 8 and 11 is that portion of the camera body which carries the shaft 112, which portion is also designated in FIGURES 6 and 10. FIGURES 7, 8 and 11 also illustrate clearly the bifurcated or forked inner end of the locking clip 98.

It is often desirable to utilize a 35 mm. camera, for example, in substitution for the "Polaroid," and for this purpose the present invention makes provision for the desired interchangeability. A representative 35 mm. camera is illustrated in FIGURE 10 and designated by the numeral 126 which, as an element, corresponds to the camera back 24 and itself may be regarded as a camera back element. The mounting of the camera back or element 126 on the rear part 56 of the body 22 involves the use of an adapter 128 which has forward ring means comprising an annular rib 130 that corresponds to the annular rib 74 on the camera back 24. Thus, the ring means represented by the rib 130 concentrically interfits with the ring means represented by the annular groove 72 in the back plate 56, thus duplicating the light-tight seal effected when the "Polaroid" back 24 is mounted on the body 22. The relationship of the film plane of the 35 mm. camera to the opening 62 and optical axis 70 of the camera remains as before. By way of further duplication of the "Polaroid" combination, the adapted 128 has rigidly carried thereto a forwardly extending pin or shaft 132 which is received by the bore 58 and which has adjacent to its forward end an annular groove 134 for receiving the bifurcated or forked inner end of the releasable locking clip or means 98, as shown in FIGURE 10. However, since the mounting here does not involve rotation of the camera back for the purpose of dual-positioning thereof, other changes are effected, among which is the provision of a pin 136, eccentric to the shaft or pin 132, and projecting forwardly so as to be receivable in a notch or depression 138 in the back plate 56. By way of orientation relative to FIGURE 9, the two diametrically opposed openings shown at 140 are for the purpose of carrying inserts 142 which constitute part of the diametrically opposed detent means 104 (FIGURE 5).

The shaft 132 differs at its forward end from the shaft 94, inasmuch as it is unnecessary to control the shutter as in the previous instance. For this purpose, the front end of the shaft 132 is simply in the form of a cone 144 which has the effect of holding the interior shutter control arm 114 in the release position (FIGURES 10 and 11).

It will be clear that the interchangeable use of the two backs with the camera 22 materially improves the flexibility and adaptability of the camera, particularly since it is unnecessary to duplicate the entire structure; that is, the basic camera represented by the body 22, lens 42 and beam-splitting device 40 may be used with different types of cameras. It follows, of course, that other cameras could be used in place of the "Polaroid" or 35 mm., it being understood that, broadly, the two are merely representative. On the other hand, there is specific novelty in the two specific situations.

Modifications such as this, as well as others that will readily occur to those versed in the art, may be utilized in the exploitation of the invention, all without departing from the spirit and scope thereof.

What is claimed is:

1. A camera, comprising: a body having a part including a film-exposing opening and a lens spaced in one direction from said opening along an optical axis and fixed against angular displacement relative to said opening; a film-carrying element closely spaced in the opposite direction from and adjoining said opening at a light-tight junction including relatively movable light-seal portions respectively on said element and part, said element having means for carrying a film in a film plane normal to said optical axis at said opening and of an area greater than that of said opening so that initially a first portion of such film plane is in register with said opening and at least a second portion is out of register with said opening; pivot means rotatably and removably mounting said element on the body on a pivot axis normal to the film plane and offset from the optical axis and intermediate said film plane portions and enabling selective turning of said element about said pivot axis between a first postion in which said first and second film plane portions are respectively in and out of register with said opening and a second position in which said second and first film plane portions are respectively in and out of register with said opening; said pivot means including a shaft on the pivot axis and fixed to the element and a bore in the body coaxially slidably and rotatably receiving the shaft, said shaft terminating within the body and axially short of the lens; disengageable lock means carried by the body independently of the lens and normally cooperative with the shaft to hold the shaft and element against separation from the body and lens while permitting turning of the shaft and element relative to the body and lens, said lock means including an internal part within the body and selectively movable into and out of locking engagement with the shaft and an exterior control part manually accessible from outside the body and connected to and for operating said internal part; and partition means operative to close off from light whichever film plane portion is out of register with said opening.

2. The invention defined in claim 1, including: shutter means operative on the lens; means for actuating the shutter when a film plane portion is in register with said opening; and safety means operative between said actuating means and said element for preventing a consecutive actuation of the shutter until said element has been turned to register another of said film plane portions with said opening, said safety means including a cam portion on said shaft and a cam follower riding said cam portion internally of the body and connected to the actuating means.

3. The invention defined in claim 1, in which: the lens includes shutter means; actuating means is carried by the body for actuating the shutter; and means is provided internally of the body and between the actuating means and the shaft for conditioning the actuating means for only one actuation of the shutter means for each registration of a film plane portion with said opening.

4. The invention defined in claim 1, in which: the optical axis at said opening is horizontally fore-and-aft and said element is rearwardly of said opening; the pivot axis is offset below said optical axis and said opening is in the upper half of a circle having the pivot axis as its center; the partition means includes an upper edge lying substantially on a horizontal diameter of said circle; the light-tight junction parts comprise movably interfitting circular portions respectively on said element and camera body part and having said pivot axis as a common center; and said film plane portions lie respectively above and below said upper edge of the partition means.

5. A camera, comprising: a body having a fore part including a lens on a fore-and-aft optical axis, and a rear part normal to said axis and provided with first ring means circular about an axis offset from and parallel to said optical axis and of such diameter that said optical axis lies within the periphery thereof, said rear part further having a light-transmitting opening therein within said periphery and in alinement with the lens on the optical axis; a film-carrying part juxtaposed over the rear part and having second ring means concentrically interfitting with the first ring means and providing a light-tight seal, said film-carrying part having means for carrying film in a film plane at least in part exposed to the lens via said opening and said second ring means being axially rearwardly separable from the first ring means; and means mounting the film-carrying part on the body rear part for axially forward connection to and axially rearward disconnection from said part, and including a pin coaxially fixed to one part on the ring means axis and projecting toward the other part, said other part having a coaxial recess axially receiving said pin when the parts are disconnected and said other part being axially separable from said pin and when the parts are disconnected, a portion of the pin receivable in the recess having lock-receiving means, and a lock device carried by said other part and including a portion movable into and out of said lock-receiving means.

6. The invention defined in claim 5, including: positioning means eccentric to the pin and cooperative between the parts to hold the parts against relative angular movement about said pin.

7. The invention defined in claim 5, in which: the lock-receiving means is a groove in the pin transverse to the length of the pin and the lock-device is movable into and out of said groove.

References Cited in the file of this patent
UNITED STATES PATENTS

| | | | |
|---|---|---|---|
| 2,185,508 | 1/40 | Kunze | 95—1.1 |
| 2,204,819 | 6/40 | O'Brien | 95—38 |
| 2,942,537 | 6/60 | Zimmerman | 95—1.1 |
| 2,951,429 | 9/60 | Leong | 95—11 |

FOREIGN PATENTS

| | | |
|---|---|---|
| 375,344 | 5/07 | France. |
| 1,217,255 | 12/59 | France. |
| 190,447 | 7/37 | Switzerland. |

NORTON ANSHER, *Primary Examiner.*

JOHN M. HORAN, *Examiner.*